(12) United States Patent
Farkas et al.

(10) Patent No.: US 11,962,509 B2
(45) Date of Patent: Apr. 16, 2024

(54) SPREAD SPECTRUM HIGH-SPEED SERIAL LINK

(71) Applicant: DELL PRODUCTS, LP, Round Rock, TX (US)

(72) Inventors: Sandor Farkas, Round Rock, TX (US); Bhyrav Mutnury, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 85 days.

(21) Appl. No.: 17/723,551

(22) Filed: Apr. 19, 2022

(65) Prior Publication Data

US 2023/0336497 A1    Oct. 19, 2023

(51) Int. Cl.
*H04L 47/62* (2022.01)
*H04L 47/6295* (2022.01)
*H04L 49/90* (2022.01)

(52) U.S. Cl.
CPC .......... *H04L 47/6295* (2013.01); *H04L 49/90* (2013.01)

(58) Field of Classification Search
CPC ....... H04L 47/6295; H04L 49/90; H04L 7/08; H04L 7/00; H04L 7/03; H04L 1/243; H04L 25/03; H04L 1/00; H03L 7/08; H03L 7/197; H03L 12/863; H03L 12/861; H03L 7/06; H04B 1/00; H04B 15/04; G06F 1/03; G06F 1/12; G06F 1/08; G06F 13/42; G06F 13/38; G06F 1/06; G06F 7/582; H03M 3/00; H03K 7/08; H03D 3/24
USPC ....................................................... 370/429
See application file for complete search history.

(56) References Cited

U.S. PATENT DOCUMENTS

| | | | | |
|---|---|---|---|---|
| 7,477,676 B2* | 1/2009 | Kokubo | .................... | G06F 1/04 375/376 |
| 7,571,267 B1* | 8/2009 | Luis | .................... | G06F 13/4291 713/400 |
| 7,642,820 B2* | 1/2010 | Chen | .................. | H03K 4/06 327/134 |
| 8,037,336 B2* | 10/2011 | Chawla | ................. | H03L 7/1976 713/400 |
| 8,446,194 B2* | 5/2013 | Yun | ........................ | H03L 7/1976 327/147 |
| 8,516,290 B1* | 8/2013 | Thomas | ................ | G06F 13/405 713/400 |
| 8,531,214 B2* | 9/2013 | Chen | ..................... | H03L 7/1976 327/147 |
| 8,786,335 B2* | 7/2014 | Hsu | ........................ | H03L 7/087 327/147 |
| 8,817,841 B2* | 8/2014 | Bafra | .................... | H04B 1/7087 375/135 |
| 9,832,551 B2* | 11/2017 | Yoshida | ................. | H04Q 11/00 |
| 10,261,539 B2* | 4/2019 | Bal | ........................... | G06F 1/08 |

(Continued)

*Primary Examiner* — Man U Phan
(74) *Attorney, Agent, or Firm* — Larson Newman, LLP

(57) ABSTRACT

A clock circuit is provided for clocking a high-speed data communication interface. The interface has (N) lanes. The clock circuit includes a triangle wave generator, N clock generators, and N lane FIFOs. The triangle wave generator provides P phase outputs, wherein P is greater than or equal to N. Each clock generator receives an associated one of the phase outputs and generates a clock signal having a frequency based upon the phase output. Each FIFO receives data and an associated one of the clock signals, and provides the data at a clock frequency associated with the associated clock signal.

20 Claims, 3 Drawing Sheets

(56) References Cited

U.S. PATENT DOCUMENTS 10,366,044 B2 * 7/2019 Choi ................... G06F 1/266
11,323,131 B2 * 5/2022 Midha .................. H03M 3/37

* cited by examiner

SPREAD SPECTRUM HIGH-SPEED SERIAL LINK

FIELD OF THE DISCLOSURE

This disclosure generally relates to information handling systems, and more particularly relates to providing spread spectrum high-speed serial links on an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A clock circuit may be provided for clocking a high-speed data communication interface. The interface may have (N) lanes. The clock circuit may include a triangle wave generator, N clock generators, and N lane FIFOs. The triangle wave generator may provide P phase outputs, wherein P is greater than or equal to N. Each clock generator may receive an associated one of the phase outputs and generate a clock signal having a frequency based upon the phase output. Each FIFO may receive data and an associated one of the clock signals, and provide the data at a clock frequency associated with the associated clock signal.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
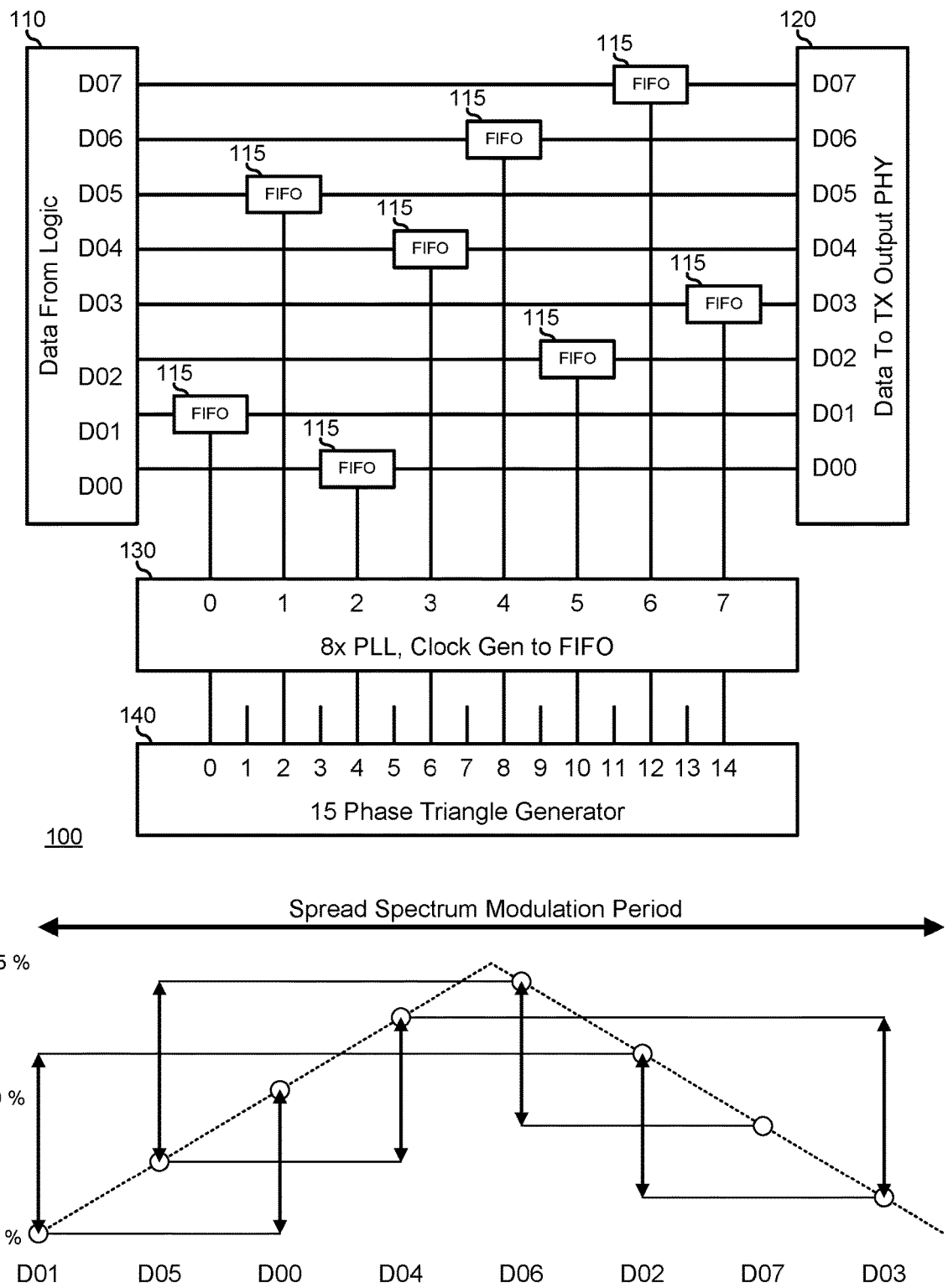
FIG. 1 is a block diagram of a clock circuit according to an embodiment of the current disclosure.

FIG. 1 illustrates a clock circuit 100 within a transmitter for a high-speed data link. The transmitter represents a portion of an electronic component that is configured to receive data from a logic portion of the electronic component, and to provide the data to physical data transmission layer of a high-speed data communication link between the transmitting electronic component and a receiving electronic component. For example, the transmitter may be included in a first integrated circuit of an information handling system, and the receiver may be included in a second integrated circuit of the information handling system. Here, the transmitter and the receiver may be interconnected by one or more data communication lanes instantiated as a trace on a printed circuit board (PCB) of the information handling system. As such, a data communication link may be characterized by the number of data communication lanes that make up the data communication link. For example, where a data communication link includes four (4) data communication lanes, the data communication link may be described as a ×4 (by-four) data communication link, where a data communication link includes eight (8) data communication lanes, the data communication link may be described as a ×8 (by-eight) data communication link, etc. Typically, data communication links are provided as ×4, ×8, ×16, or ×32 data communication links, but other numbers of lanes may be provided in a data communication link, as needed or desired. As illustrated here, the transmitter includes eight (8) data communication lanes (D00-D07).

Clock circuit 100 includes logic 110 to provide data to the high speed data communication interface, data first-in/first-out buffers (FIFOs) 115 on each lane, transmit physical layer devices (PHYs) 120 for each lane, clock generation circuits 130 for each FIFO, and a triangle signal generator 140. The data generated by logic 110 may typically be understood to be generated by parallel data processing, such as where the electronic component provides 64-bit processing. Here, logic 110 is configured to serialize the parallel data, providing different portions of the parallel data to each data communication lane. For example, logic 110 may serialize a first byte of the parallel data to lane D00, may serialize a second byte of the parallel data to lane D01, etc. The serialized data for each lane is provided to the associated FIFO 115 for that lane. Note that the serialized data may be provided as an encoding of the actual data, as needed or desired. That is, for a given number of data bits, the serialized data may include some greater number of bits, in order to provide more balanced data state transitions and clock encoding within the data stream provided on the data communication link between the transmitter and the receiver. For example, logic 110 may provide an 8-bit/10-bit encoding scheme, a 64-bit/66-bit encoding scheme, a 128-bit/130-bit encoding scheme, a 128-bit/132-bit encoding scheme, or another encoding scheme, as needed or desired. The details of data processing, data serialization, data encoding, clock encoding, and other aspects of serial data generation are known in the art and will not be further disclosed herein, except as needed to illustrate the current embodiments.

In operation, logic 110 operates to provide the serialized data for each lane to respective FIFO 115. Each FIFO 115 is clocked by clock generation circuits 130, and the clocked output from each FIFO is provided to the respective PHY 120 for transmission on the lane of the high-speed data communication link to the receiving element. In a typical transmitter, the clock circuit includes a common clock, such as a single PLL, for all of the FIFOs. It has been understood by the inventors of the current disclosure that providing a common clock for each FIFO in a high-speed data communication link results in the simultaneous switching of signal state on all lanes of the link. The simultaneous switching of the signal state on all lanes of a high-speed data communication link may lead to excessive crosstalk from one or more aggressor lanes into a victim lane, resulting in poor signal quality at the receiver. Moreover, simultaneous switching produces excessive switching current transients which must be accommodated by a power supply of the information handling system without inducing a voltage drop on the lanes, resulting in increased noise on the power planes of the information handling system, and potentially leading to further signal degradation at the receiver.

In a particular embodiment, clock generator 130 includes eight (8) separate clock outputs, each generated by a separate PLL. Each PLL of clock generator 130 includes an input, such as an input to a voltage controlled oscillator (VCO), or the like, that varies the frequency of the associated PLL. Here, the input to each PLL is driven by a different output from triangle generator 140. As illustrated, triangle generator 140 is a 15-phase triangle generator, and the $0^{th}$, $2^{nd}$, $4^{th}$, $6^{th}$, $8^{th}$, $10^{th}$, $12^{th}$, and $14^{th}$ outputs are provided to respective PLL inputs of clock generator 130. Here, as illustrated in the bottom portion of FIG. 1, triangle generator 140 provides an output swing on each output that causes the associated PLL to vary its output frequency within a range of +/−0.5% of a nominal clock frequency for the high-speed data communication interface. For example, where the high-speed data communication interface represents a PCIe 4.0 interface with a 16 GHz clock, triangle generator 140 may provide an output swing on each output that causes the associated PLL to vary its output frequency within a range of 15.92-16.08 GHz. It will be understood that other frequency shift ranges may be utilized, such as a range of +/−0.25%, 0.0 to −0.5%, or another range, as needed or desired.

Further, triangle generator 140 will be understood to generate a triangle wave on each output with a particular modulation period. In the current embodiment, the modulation period is separated into 15 phases, and alternate outputs are provided to the PLLs. More generally, a triangle generator may provide (2N−1) output phases with alternate outputs being provided to the lane PLLs, where N is the number of lanes. For example, a ×4 high-speed data communication interface may utilize a 7-phase triangle generator, a ×16 high-speed data communication interface may utilize a 31-phase triangle generator, and so on. In this way, a first output and a last output are not overlapping outputs, as illustrated by the fact that the first output on the triangle wave is offset from the last output of the triangle wave.

Note further that the clock outputs are arranged to be provided to FIFOs 115 in a specific pattern that is selected to provide the maximum phase offset between the lanes. This is possible given an assumption that consecutive lanes are laid out on a PCB of the information handling system in their consecutive order, that is, that lane 0 is on an outside edge, that lane 1 is next to lane zero, that lane 2 is next to lane 1, etc. In the illustrated case, note that each adjacent lane is separated by at least 50% of the full modulation range from each other. Given the above assumption, the clock outputs can be provided in different orders for different numbers of lanes, as shown in Table 1, below.

TABLE 1

| Clock Spread Pattern | |
| --- | --- |
| Bus width | Best spread pattern |
| ×4 | 1-0-2-3 |
| ×8 | 1-5-0-4-6-2-7-3 |
| ×16 | 1-5-9-13-0-4-8-12-14-10-6-2-15-11-7-3 |

Where the above assumption is not true, other patterns may be utilized as needed or desired to maximize the phase offset between the lanes of the high-speed data communication interface.

Note that in a typical receiver, the receiver performs clock recovery to lock the receiver PLL, and decodes and de-skews the data asynchronously. In other cases, a receiver can synchronize its PLL to the modulating waveform of the transmitter to synchronously decode the data.

Figure 2:
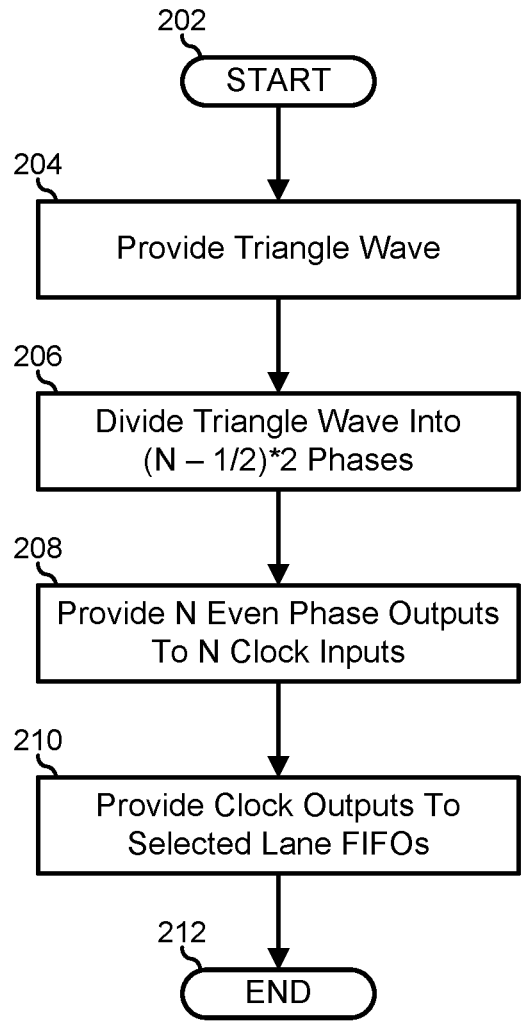
FIG. 2 is a flowchart illustrating a method for providing spread spectrum clocking on a high-speed data communication interface according to an embodiment of the current disclosure.

FIG. 2 illustrates a method 200 for providing spread spectrum clocking on a high-speed data communication interface, starting at block 200. A transmitter component of an information handling system is provided with a triangle wave generator in block 204. The clock generator is divided into (2N−1) output phases in block 206, where N is the number of lanes in the high-speed data communication interface. The N even outputs of the triangle wave generator are provided to drive the inputs of PLLs for each lane of the high-speed data communication interface in block 208. The outputs of the PLLs for each lane are provided for clocking their respective lane FIFOs in block 210, and the method ends in block 212.

Figure 3:
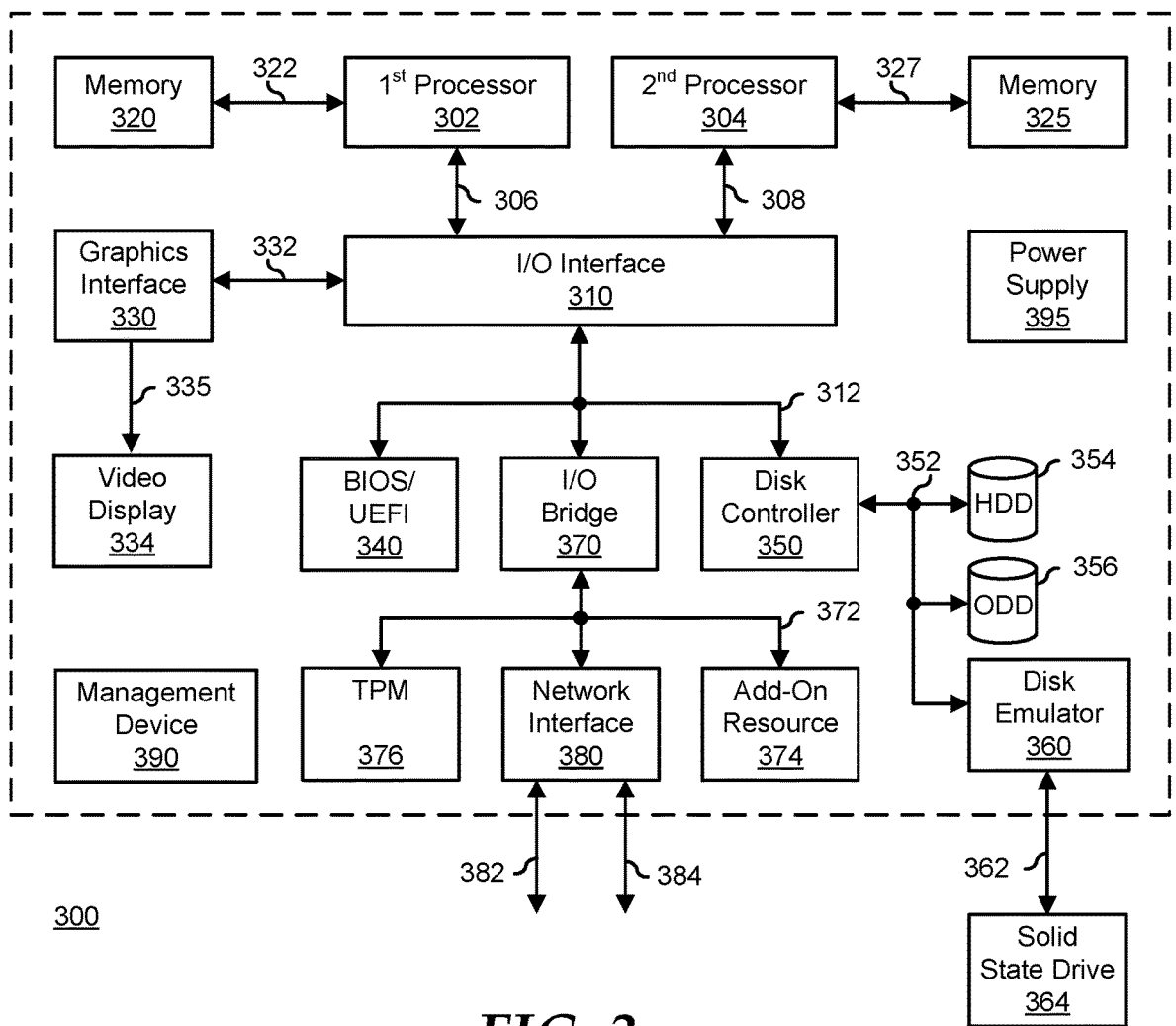
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A clock circuit for clocking a high-speed data communication interface having a number (N) of lanes, the clock circuit comprising:
    a triangle wave generator that provides a number (P) of phase outputs, wherein P is greater than or equal to N;
    a number (N) of clock generators, wherein each clock generator receives an associated one of the phase outputs and generates a clock signal having a frequency based upon the phase output; and
    a number (N) of lane first-in/first-out buffers (FIFOs), wherein each FIFO receives data and an associated one of the clock signals, and provides the data at a clock frequency associated with the associated clock signal;
    wherein N is equal to four (4), and the order provides a $0^{th}$ clock signal to the FIFO associated with a $2^{nd}$ lane, a $1^{st}$ clock signal to the FIFO associated with a $0^{th}$ lane, a $3^{rd}$ clock signal to the FIFO associated with a $3^{rd}$ lane, and a $4^{th}$ clock signal to the FIFO associated with a $2^{nd}$ lane.

2. The clock circuit of claim 1, wherein P is equal to seven (7).

3. The clock circuit of claim 2, wherein the triangle wave generator provides phase outputs labeled from 0 to six (6).

4. The clock circuit of claim 3, wherein even labeled phase outputs are provided to the N clock generators.

5. The clock circuit of claim 1, wherein the clock signals are labeled from 0 to three (3).

6. The clock circuit of claim 5, wherein each clock signal is provided to the associated FIFO in an order selected to maximize a clock slew between adjacent lanes of the high-speed data communication interface.

7. The clock circuit of claim 1, wherein each phase output provides an output swing that varies a clock signal frequency on an associated PLL within a predetermined frequency range.

8. A method for clocking a high-speed data communication interface having a number (N) of lanes, the method comprising:
    providing, by a triangle wave generator of a clock circuit of the high-speed data communication interface, a number (P) of phase outputs, wherein P is greater than or equal to N;
    receiving, by each one of a number (N) of clock generators of the clock circuit, an associated one of the phase outputs;
    generating, by each clock generator, a clock signal having a frequency based upon the phase output;
    receiving, by each one of a number (N) of lane first-in/first-out buffers (FIFOs), data and an associated one of the clock signals; and
    providing, by each FIFO, the data at a clock frequency associated with the associated clock signal;
    wherein N is equal to sixteen, and the order provides a $0^{th}$ clock signal to the FIFO associated with a $1^{st}$ lane, a $1^{st}$ clock signal to the FIFO associated with a $5^{th}$ lane, a $2^{nd}$ clock signal to the FIFO associated with a $9^{th}$ lane, a $3^{rd}$ clock signal to the FIFO associated with a $13^{th}$ lane, a $4^{th}$ clock signal to the FIFO associated with a $0^{th}$ lane, a $5^{th}$ clock signal to the FIFO associated with a $4^{th}$ lane, a $6^{th}$ clock signal to the FIFO associated with an $8^{th}$ lane, a $7^{th}$ clock signal to the FIFO associated with a $12^{th}$ lane, an $8^{th}$ clock signal to the FIFO associated with a $14^{th}$ lane, a $9^{th}$ clock signal to the FIFO associated with a $10^{th}$ lane, a $10^{th}$ clock signal to the FIFO associated with a $6^{th}$ lane, an $11^{th}$ clock signal to the FIFO associated with a $2^{nd}$ lane, a $12^{th}$ clock signal to the FIFO associated with a $15^{th}$ lane, a $13^{th}$ clock signal to the FIFO associated with an $11^{th}$ lane, a $14^{th}$ clock signal to the FIFO associated with a $7^{th}$ lane, and a $15^{th}$ clock signal to the FIFO associated with a $3^{rd}$ lane.

9. The method of claim 8, wherein P is equal to 31.

10. The method of claim 9, further comprising:
    providing, by the triangle wave generator, phase outputs labeled from 0 to 30.

11. The method of claim 10, further comprising:
    providing even labeled phase outputs are provided to the N clock generators.

12. The method of claim 8, wherein the clock signals are labeled from 0 to 15.

13. The method of claim 12, further comprising:
    providing each clock signal to the associated FIFO in an order selected to maximize a clock slew between adjacent lanes of the high-speed data communication interface.

14. The method of claim 8, wherein each phase output provides an output swing that varies a clock signal frequency on an associated PLL within a predetermined frequency range.

15. An information handling system, comprising:
a transmitter; and
a receiver coupled to the transmitter by a high-speed data communication interface having a number (N) of lanes;
wherein the transmitter includes a clock circuit for clocking the high-speed data communication interface, the clock circuit including:
  a triangle wave generator that provides a number (P) of phase outputs, wherein P is greater than or equal to N;
  a number (N) of clock generators, wherein each clock generator receives an associated one of the phase outputs and generates a clock signal having a frequency based upon the phase output; and
  a number (N) of lane first-in/first-out buffers (FIFOs), wherein each receives data and an associated one of the clock signals, and provides the data at a clock frequency associated with the associated clock signal; and
wherein the receiver asynchronously decodes the data from the high-speed data communication interface; and
wherein N is equal to eight (8), and the order provides a $0^{th}$ clock signal to the FIFO associated with a $1^{st}$ lane, a $1^{st}$ clock signal to the FIFO associated with a $5^{th}$ lane, a $2^{nd}$ clock signal to the FIFO associated with a $0^{th}$ lane, a $3^{rd}$ clock signal to the FIFO associated with a $4^{th}$ lane, a $4^{th}$ clock signal to the FIFO associated with a $6^{th}$ lane, a $5^{th}$ clock signal to the FIFO associated with a $2^{nd}$ lane, a $6^{th}$ clock signal to the FIFO associated with a $7^{th}$ lane, and a $7^{th}$ clock signal to the FIFO associated with a $3^{rd}$ lane.

16. The clock circuit of claim 7, wherein the output swing is within a range of +/−5% of a nominal clock frequency of the high-speed data communication interface.

17. The clock circuit of claim 7, wherein PLL has a nominal clock frequency of 16 GHz, and the output swing is with a range of 15.92-16.08 GHz.

18. The method of claim 14, wherein the output swing is within a range of +/−5% of a nominal clock frequency of the high-speed data communication interface.

19. The method of claim 14, wherein the PLL has a nominal clock frequency of 16 GHz, and the output swing is with a range of 15.92-16.08 GHz.

20. The information handling system of claim 15, wherein each phase output provides an output swing that varies a clock signal frequency on an associated PLL within a predetermined frequency range.

* * * * *